(12) United States Patent
Bohm et al.

(10) Patent No.: US 6,343,745 B1
(45) Date of Patent: Feb. 5, 2002

(54) SECURITY DEVICE

(75) Inventors: Michael Bohm, Kirchheim; Theo Burchard, Gmund; Christian Schmitz, Neuhaus/Schliersee, all of (DE)

(73) Assignee: Giesecke & Devrient GmbH (DE)

( * ) Notice: Subject to any disclaimer, the term of this patent is extended or adjusted under 35 U.S.C. 154(b) by 0 days.

(21) Appl. No.: 09/308,665

(22) PCT Filed: Dec. 5, 1997

(86) PCT No.: PCT/EP97/06825

§ 371 Date: Sep. 2, 1999

§ 102(e) Date: Sep. 2, 1999

(87) PCT Pub. No.: WO98/25236

PCT Pub. Date: Jun. 11, 1998

(30) Foreign Application Priority Data

Dec. 6, 1996 (DE) .......................................... 196 50 759

(51) Int. Cl.7 ................................................ G06K 19/06
(52) U.S. Cl. ........................ 235/493; 235/494; 283/84
(58) Field of Search ................................. 235/493, 494, 235/449; 283/82, 83, 84

(56) References Cited

U.S. PATENT DOCUMENTS

| | | | | |
|---|---|---|---|---|
| 5,111,033 A | * | 5/1992 | Fujita et al. | 235/488 |
| 5,354,099 A | * | 10/1994 | Kaule et al. | 283/85 |
| 5,432,329 A | * | 7/1995 | O'Boyle et al. | 235/487 |
| 5,516,153 A | * | 5/1996 | Kaule | 283/85 |
| 5,545,883 A | * | 8/1996 | Sasou | 235/449 |
| 5,599,047 A | * | 2/1997 | Kaule et al. | 283/85 |
| 5,614,824 A | * | 3/1997 | Dames et al. | 324/239 |
| 5,643,686 A | * | 7/1997 | Isshiki et al. | 428/694 |
| 5,808,758 A | * | 9/1998 | Lolmsdorf | 359/2 |
| 6,146,773 A | * | 11/2000 | Kaule | 428/611 |
| 6,210,777 B1 | * | 4/2001 | Vermeulen et al. | 428/195 |

FOREIGN PATENT DOCUMENTS

| | | | |
|---|---|---|---|
| EP | 0 310 707 A2 | * | 12/1989 |
| EP | 0 330 733 A1 | * | 1/1994 |
| GB | 1127043 A | * | 9/1968 |
| WO | WO-90/08367 | * | 7/1990 |

* cited by examiner

Primary Examiner—Karl D. Frech
Assistant Examiner—Diane I. Lee
(74) Attorney, Agent, or Firm—Bacon & Thomas, PLLC

(57) ABSTRACT

The invention relates to a security element for a security document such as a bank note, ID card or the like consisting of a translucent plastic layer having an opaque layer with gaps in the form of characters, patterns or the like recognizable in transmitted light. Additionally the security element has a magnetic layer in the form of spaced-apart magnetic areas forming a coding, the gaps recognizable in transmitted light being disposed in the magnetic layer-free intermediate areas of the coding.

33 Claims, 5 Drawing Sheets

SECURITY DEVICE

BACKGROUND OF THE INVENTION

1. Field of the Invention

This invention relates to a security element for a security document such as a bank note, ID card or the like comprising a translucent carrier material having an opaque layer with gaps in the form of characters, patterns or the like recognizable in transmitted light, and a magnetic layer disposed below the opaque layer.

2. Description of the Related Art

It has been known for some time to provide security documents with plastic security threads having a magnetic coating and thus serving as a machine-readable security feature (DE 16 96 245 A1, EP 0 310 707 A1).

To increase the forgery-proofness of this proven security feature further, it has also been proposed to provide the magnetic coating on the carrier material in discontinuous form. For example EP 0 407 550 A1 describes a security document with an embedded security thread provided with a binary code consisting of magnetic material. Certain bit lengths are defined which are constant over the total length of the strip. The coating of a bit length with magnetic material corresponds for example to a 1 while a bit length without magnetic material corresponds to a 0. The binary code known from EP 0 407 550 A1 is characterized in that it is composed of alternatingly disposed separation segments and word segments whereby the word portion consists of a certain number of bit lengths and the sequence of binary values of the separation segments must not occur within this word length in order to permit clear detection of the word segments. This security element has the disadvantage, however, that there is no possibility of fast visual checking as is necessary in many situations of daily life.

It has therefore likewise been proposed to combine machine-testable security features with visual features. EP 0 516 790 A1 discloses a security document with such a security element. The security thread described here consists of a transparent plastic carrier layer with a metallic coating in which gaps are provided in the form of characters or patterns, the so-called negative writing. If the thread is present in the paper pulp, these gaps and the metallic surroundings are hardly visible when viewed in reflected light. When viewed in transmitted light, however, the transparent gaps stand out in strong contrast from their opaque surroundings and are thus easily recognized. At the same time the security element has a magnetic coating provided e.g. below the metal layer in the edge areas of the thread and symmetrically to the gaps along the running direction of the element in the document.

BRIEF SUMMARY OF THE INVENTION

Starting out from this prior art the invention is based on the problem of providing a security element which offers increased protection from forgery while at the same time being easy to produce.

The solution to this problem can be seen in the independent claims. Developments are the object of the subclaims.

The invention starts out from the idea of combining the advantages of visually testable negative writing and machine-readable magnetic coding and ensuring increased protection from forgery relative to the individual security features via their special mutual association on the security element.

The inventive security element therefore consists according to a first embodiment of an at least translucent plastic layer having an opaque layer with gaps and a magnetic coding, the gaps being disposed in the magnetic layer-free areas of the element. The special geometrical arrangement of the gaps and the magnetic areas can consist for example of a nesting of coding and gaps, i.e. the magnetic layer-free portions of the coding are used to dispose the visually testable negative characters in this area. Additionally, it is also possible, however, to provide on the security element a further machine-readable feature such as a further magnetic layer which of course must not impair the testability of the other features.

According to a preferred embodiment the security element has the form of a thread or strip which is embedded at least partly in a document material such as bank note paper, or can also be disposed on the surface.

If the security element is disposed on the surface of the document material, it is not absolutely necessary to prepare all layers necessary for authenticity detection on a separate carrier. If the security element has an optically effective layer such as a diffraction structure or interference layer elements, it is necessary to smooth the surface of the document material in the area of the security element since surface roughness impairs the optical effect and brilliance of the element. This is frequently done by applying a background layer, for example a lacquer layer. The magnetic material can be additionally brought into this layer.

According to a further embodiment of the invention this background layer can be applied in two passes. A magnetic material is added to the first layer applied and this layer then applied discontinuously, e.g. in the form of a bar code. The second layer is disposed all over the first layer and is composed so as to produce optimum adhesion between document material and further marking layers applied, such as a hologram. Here, too, the security element preferably has the form of a strip.

The following examples will therefore also be described with reference to this preferred form. However, it is equally possible within the scope of the invention to give the security element any other outer contour.

BRIEF DESCRIPTION OF THE DRAWINGS

The special embodiments of the invention and their advantages will be explained in more detail with reference to the figures, in which.

DETAILED DESCRIPTION OF THE DRAWINGS

Figure 1:
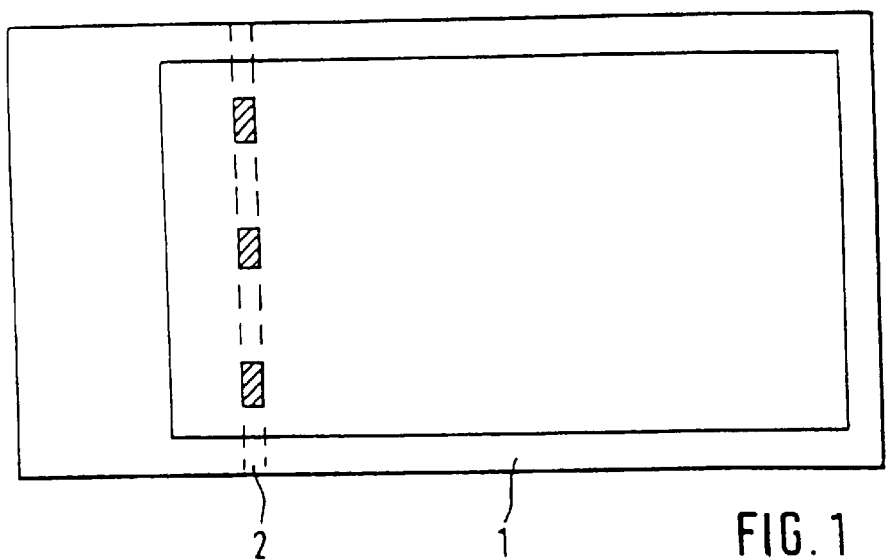
FIG. 1 shows a security document with an inventive security element.

FIG. 1 shows inventive security document 1, e.g. a bank note, in which security element 2 is embedded in the form of a so-called window security thread. Security thread 2 is quasi woven into the paper pulp during papermaking so that it passes to the document surface directly at regular intervals, as indicated by the hatched boxes. Alternatively it is also possible, however, to embed the thread completely in the paper or connect it with the document material so that can be seen all over the surface.

Figure 2:
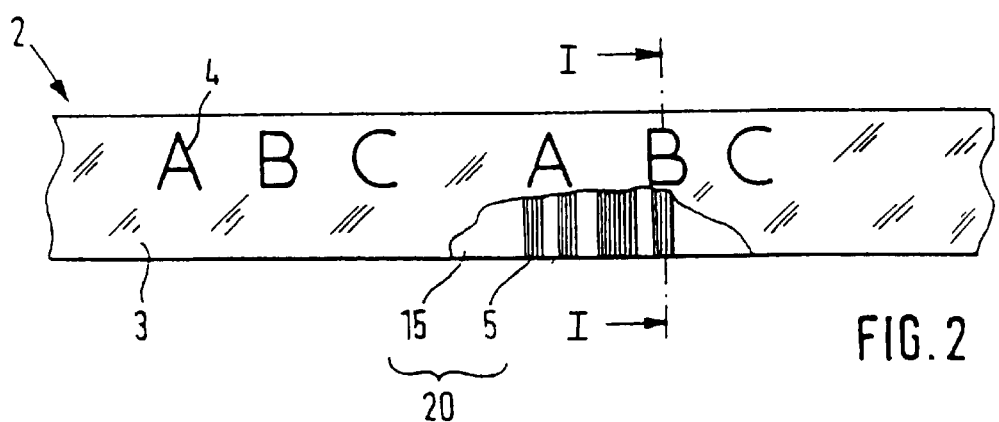
FIG. 2 shows an inventive security element in a plan view.

FIG. 2 shows schematically the outer appearance of security element 2. The viewer of security element 2 only sees opaque layer 3 having gaps 4, the negative writing, in certain areas. Magnetic coding 20 is covered by opaque layer 3 and can therefore not be localized without additional aids. However, it must be disposed in an area of element 2 where there is no negative writing 4 so as not to impair the optical effect of negative writing 4.

The vertical section in area 6 shows that magnetic coding 20 is in this case disposed parallel to gaps 4. Both coding 20 and the gaps occupy about half the thread width.

Coding 20 is composed of magnetic areas 5 and nonmagnetic areas 15 and can be disposed on security element 2 several times. Coding 20 preferably recurs continuously along element 2.

Figure 3:
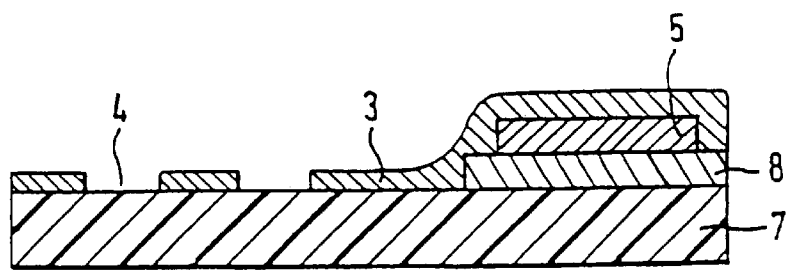
FIGS. 3 to 5 show variants of the layer structure of the security element in a section along I—I.

A section along I—I through this thread is shown in FIG. 3. Magnetic coding 20 and opaque layer 3 with gaps 4 are disposed on at least translucent plastic material 7. In the case of a thread embedded in the document material this is usually a plastic foil preferably having a thickness of about 10 to 20 microns. In the case of a security element applied to the document surface, however, it may also be useful to form the plastic material as a thin lacquer layer. It is recommendable here to prepare the layer structure on a separate foil and then transfer it to the document. This can be advantageous in particular if the security element additionally has a diffraction structure in the form of a relief structure embossed into the plastic material. The plastic material can also have other security-relevant features, such as coloring with glazing colors and/or luminescent substances.

In the edge area of plastic material 7 there is magnetic coding 20, shown here by magnetic area 5. To make magnetic material 5 invisible from both sides of thread 2 one can dispose further opaque layer 8 under coding 20. Layer 8 can be provided either in the form of a strip over the total length of security element 2 or only in areas 5 of coding 20 coated with magnetic material. Opaque layer 8 preferably consists of the same material as opaque layer 3 or at least has the same tone as opaque layer 3. However, it can also consist of a material contrasting in color with opaque layer 3.

Over coding 20 there is opaque layer 3 which covers not only coding 20 but also the other areas of plastic layer 7, being interrupted only in some places in the form of negative characters 4.

Thread 2 can be produced very simply and efficiently. In a first step plastic material 7 is printed with lower opaque layer 8. Then magnetic layer 5, and simultaneously a soluble color layer in the area of later characters 4, are applied in one printing operation or two consecutive printing operations. In a further step opaque layer 3, preferably aluminum, is vaporized over the total thread material. In a last step the soluble printing ink in the area of characters 4 is dissolved with a suitable solvent and the metal thus removed in these areas so that negative characters 4 arise.

Alternatively it is also possible to execute opaque layer 3 as a printed layer in which characters 4 are left out during the printing operation. For this purpose one preferably uses a bronze printing ink.

Figure 4:
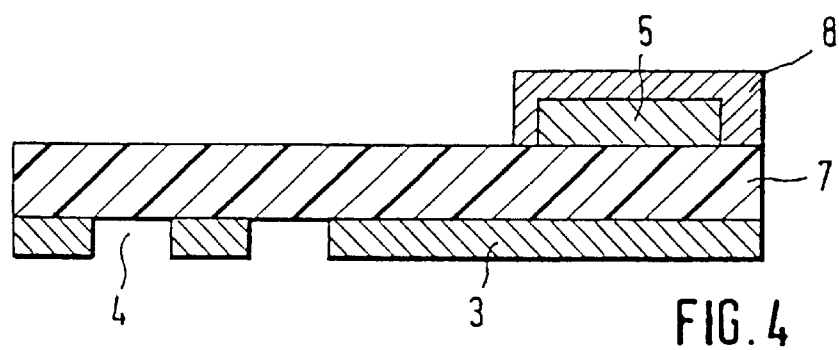

FIG. 4 shows an alternative layer structure as results according to the invention in a section along I—I in FIG. 2. Here, coding 20 or magnetic material 5 and opaque layer 3 with negative characters 4 are disposed on different surfaces of plastic material 7. Here, too, the magnetic coding is covered on both sides by opaque layers 3, 8. Opaque layer 8 can be dispensed with if magnetic iron material having a light inherent color, unlike the dark magnetic materials usually employed, is used for the magnetic areas of coding 20 or magnetic areas 5 of coding 20.

Figure 5:
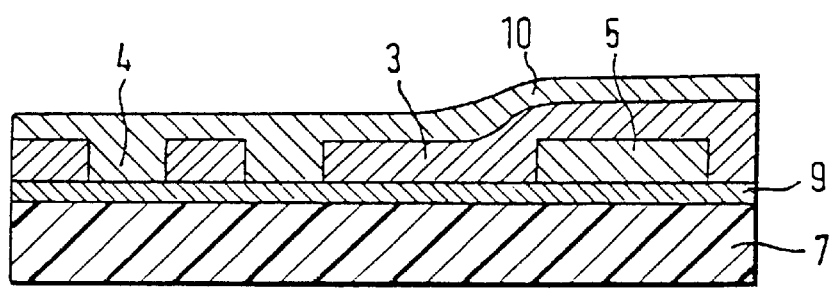

FIG. 5 shows a further variant of the layer structure of a security element according to FIG. 2. Here, plastic material 7 is provided in a first step with semitransparent metal layer 9 which is produced either by screened application of an opaque metal layer or by vaporization of a very thin continuous metal layer. Magnetic coding 20 is applied to this layer, and then covered with opaque, preferably black printing ink 3 and simultaneously negative characters 4 produced. In order to give this thread a lighter appearance, semitransparent metal layer 10 is again provided over the total element layer structure in a last step. By reason of the semitransparency of layers 9 and 10, gaps 4 still remain recognizable in transmitted light.

Against the background of these basically possible thread structures it is also possible to dispose gaps 4 and magnetic coding 20 in different geometrical constellations or to combine them with a further visually and/or mechanically readable feature to increase protection from forgery further. Such variants are shown schematically in FIGS. 6 to 11 in a plan view. For clarity's sake, only coding 20 and gaps 4 are shown here in their position on the thread relative to each other. Opaque layer 3 and any further layers present are not shown.

Figure 6:
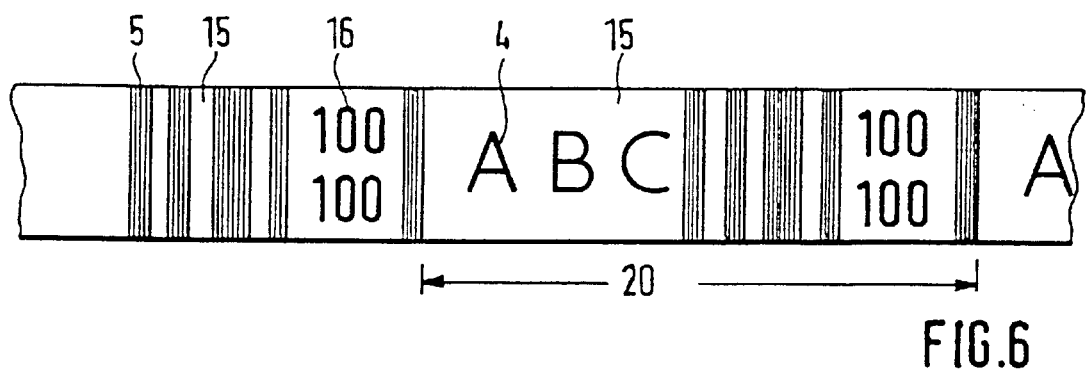
FIGS. 6 to 11 show schematic representations of the arrangement of negative writing and coding relative to each other in a plan view.
Figure 11:
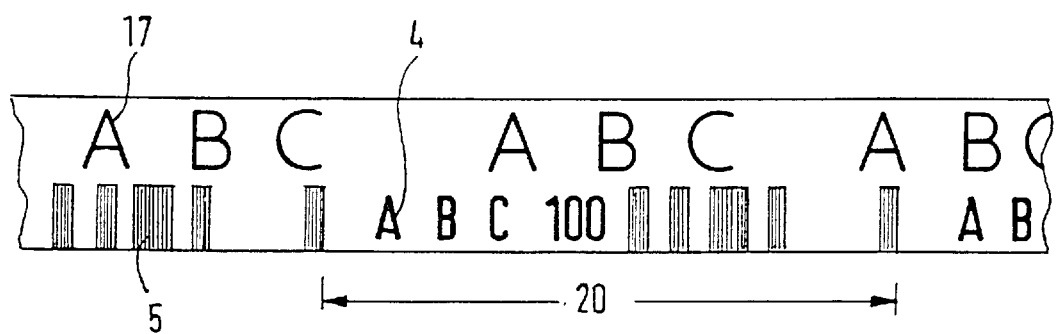

EXAMPLE 1
(FIGS. 6 and 11)

According to FIG. 6, coding 20 extends over the total width of the thread. It is composed of areas 5 provided with magnetic material, and magnetic layer-free areas 15. In a special embodiment, code 20 consists of equal-sized bit cells which are either filled with magnetic material (e.g. binary "1") or not (e.g. binary "0"). According to the invention magnetic layer-free areas 15 of coding 20 are used to dispose gaps 4 recognizable in transmitted light here. In this way negative writing 4 and magnetic coding 20 can be provided jointly on a thread without impairing each other. Gaps 4 can therefore be disposed in the middle of the thread and produced in the usual size as with threads having only negative writing. This has the advantage firstly that gaps 4 can be selected big enough to be easily recognized by the naked eye, this being advantageous in particular with security threads having a width of 2 to 3 mm which are embedded in the document material. Secondly, the thread has the same outer appearance as a usual negative writing security thread. Nothing indicates from the outside that a magnetic coding is simultaneously disposed on the thread.

The inventive idea of disposing gaps 4 in magnetic layer-free intermediate areas 15 of coding 20 can also be used especially advantageously with a coding composed of word and separation segments as known for example from EP 0 407 550 A1. For if one selects only binary "0", i.e. magnetic layer-free bit cells, for the bit sequence of the separation segments one obtains a relatively large, magnetic layer-free space in which the gaps can be disposed without any problem.

Gaps 16 can of course be provided additionally in the magnetic layer-free areas of the word segments. Increased protection from forgery is achieved if gaps 16 are executed as microcharacters, i.e. have a much smaller size than gaps 4. For microcharacters cannot be imitated, or only with great effort.

A further variant is shown in FIG. 11. Here, code 20 and negative writing 4 or magnetic layer 5 with intermediate gaps 4 are not disposed over the total width of the thread. In the remaining part of the security element, gaps 16 are likewise provided which differ in size from gaps 4, as already described.

Figure 7:
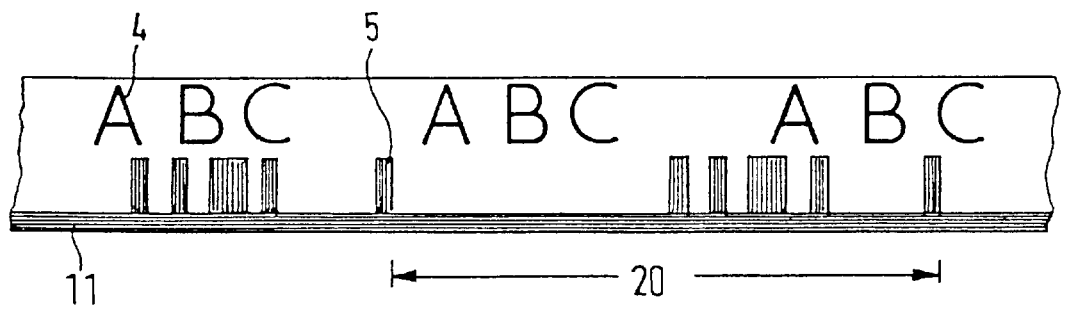
Figure 8:
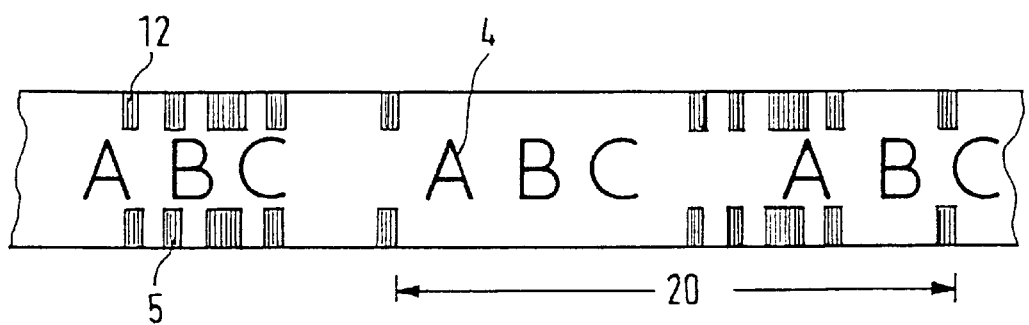
Figure 9:
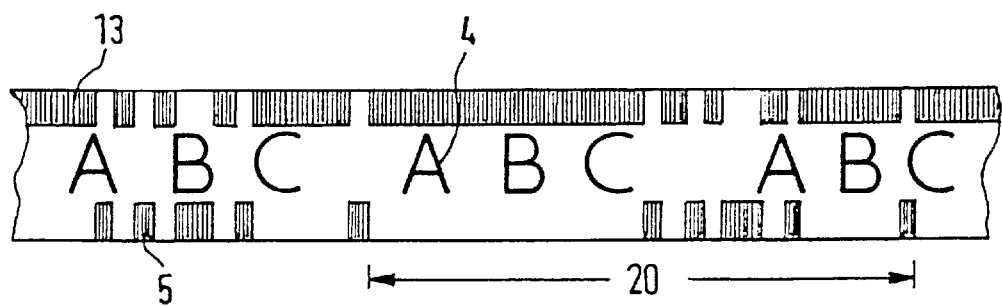

EXAMPLE 2
(FIGS. 7 to 9)

The basic idea of this embodiment is to provide a further magnetic layer besides the magnetic coding and negative writing, thereby achieving additional protection from forgery. According to FIG. 7, magnetic areas 5 of coding 20 are interconnected via further magnetic layer 11. Magnetic layer 11 must of course not impair the readability of coding 20. Since the sensors for reading the magnetic coding usually require a strong signal, magnetic material 5 of coding 20 must have a certain minimum thickness. For a mere magnetic "continuity check" along thread 2, however, a much smaller layer thickness would be sufficient. This means that magnetic layer 11 must have a smaller thickness in comparison with magnetic layer 5 so that a sensor which is to detect coding 20 receives no signal from magnetic layer 11.

This magnetic pattern can also be produced in a simple way by first printing foil 7 with a magnetic strip in the thickness of magnetic layer 11 and then applying in areas 5 in a second printing operation a magnetic layer whose layer thickness just corresponds to the difference between the layer thickness of magnetic layer 11 and the layer thickness required for coding 20.

In this way one can check solely the presence of magnetic material over the total thread length, or the magnetic coding, or both.

It is also conceivable to select another magnetic material for magnetic layer 11 and test besides coding 20 the presence of the specific physical properties of second magnetic layer 11.

FIG. 8 shows a further embodiment. Here, second magnetic layer 12 is likewise applied in the form of a coding which is identical to coding 20. In the present example this second coding is applied parallel to the first coding, and gaps 4 disposed therebetween. The codings can be disposed symmetrically or asymmetrically with gaps 4. However, the codings can also be provided in another arrangement on the element, whereby one must only make sure negative writing 4 is not covered.

The double coding makes it possible to perform a coincidence test wherein the codings are read independently of each other and then tested for agreement.

According to FIG. 9 second magnetic layer 13 is likewise applied in the form of a coding. However, it is a negative representation of first coding 20. The two codings are applied parallel and exactly staggered so that a continuous magnetic signal results along the thread upon testing.

It is of course also possible in the case of the embodiments described here to provide gaps in the form of any-sized characters between magnetic areas 5, 12, 13. It is of course equally possible to use the variants described here in Example 2 in the other embodiments, for example according to FIG. 6 or 10.

EXAMPLE 3
(FIG. 10)

Figure 10:
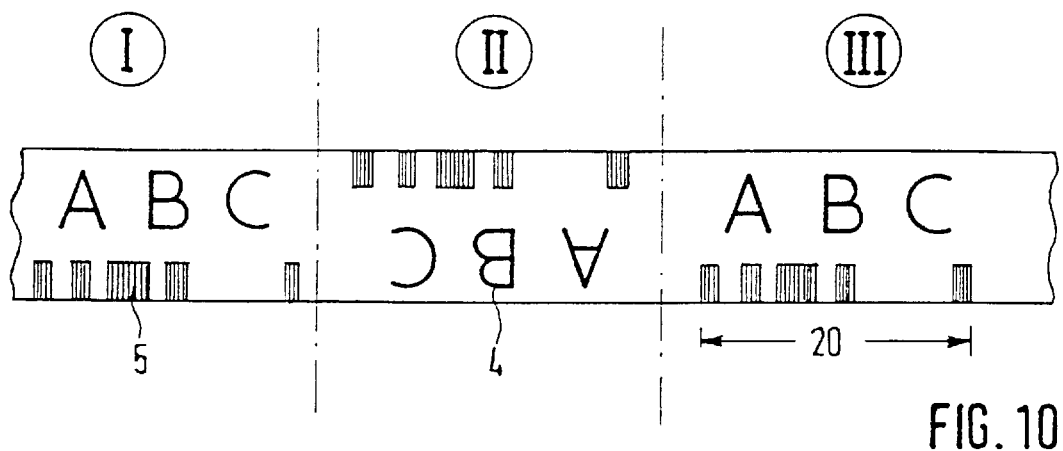

According to FIG. 10 the security element can be subdivided into partial areas, here I, II, III. The individual areas contain complete coding 20 and negative writing 4 at least once. The two are disposed parallel. But in area II the arrangement of negative writing 4 and coding 20 differs from the arrangement in area I. In the present case it is rotated by 180°. It would also be possible, however, to dispose the areas in other orientations relative to each other. With wider security elements the areas could for example be identical in their inner structure and only their relative orientation vary by being disposed at different angles to each other for example.

The more frequent the changes and the more complicated the arrangements, the more difficult it becomes for potential forgers to imitate the thread.

Figure 12:
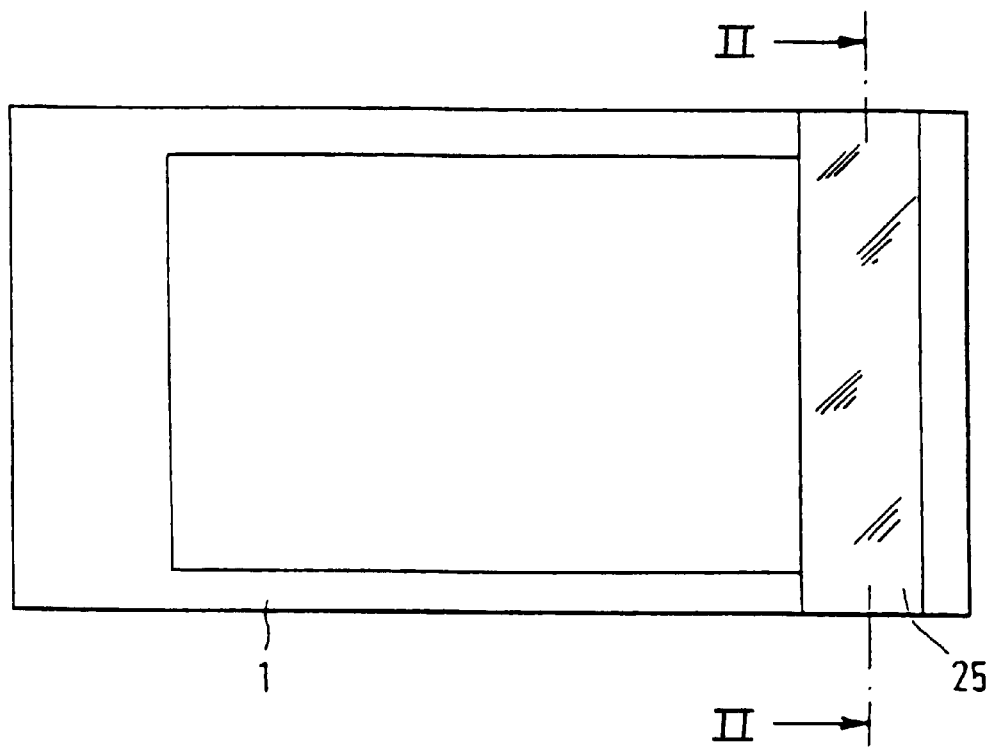
FIG. 12 shows a security document with a variant of the inventive security element.
Figure 13:
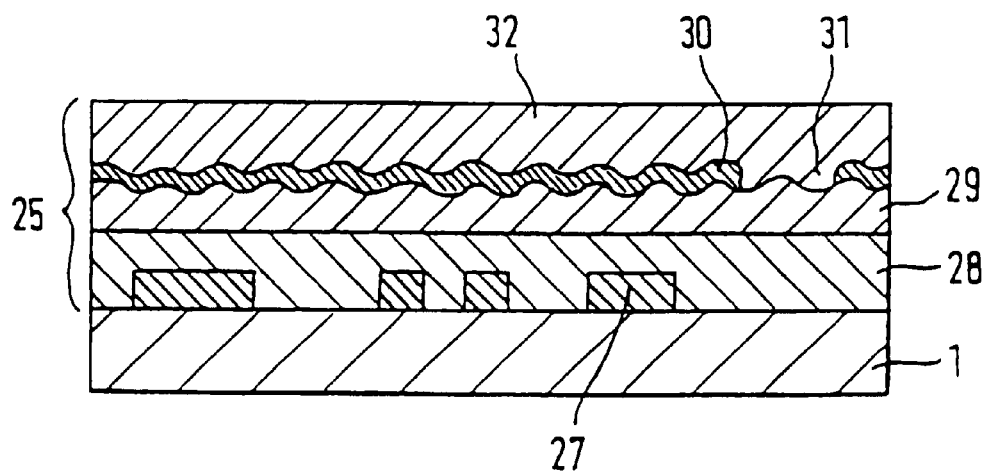
FIG. 13 shows a section along II—II through the security document of FIG. 12.

FIGS. 12 and 13 show a further embodiment of the inventive security document or security element. FIG. 12 shows document 1 in a plan view with security element 25 disposed on its surface. Security element 25 has an optically variable structure causing a change in color impression of the shown information and/or showing different information upon a change of viewing angle. The shown example involves an embossed diffraction structure combined with a metal layer so that the information stored in the diffraction structure is recognizable to the viewer in reflected light.

FIG. 13 shows a section along II—II indicating the layer structure of security element 25. Document 1 is provided with lacquer layer 27 applied in the form of a coding, for example a bar code. This lacquer layer contains magnetic pigments which can be detected by machine. Over this magnetic coding there is all-over further lacquer layer 28 containing no magnetic pigments and serving primarily to compensate the surface roughness of document 1 and ensure good adhesion to the following layers. On lacquer layer 28 there is adhesive layer 29 which can consist e.g. of a lacquer or hot-melt adhesive. Adhesive layer 29 is followed by metal layer 30 whose surface has a relief structure constituting the diffraction structure. Metal layer 30 contains gaps 31 in the form of characters, patterns or the like which represent additional information visible to the naked eye. Over the metal layer there is finally further lacquer layer 32. It can consist of any material, such as UV-curable polymers or UV radiation-initiated polymers or thermoplastic materials.

Lacquer layer 32, metal layer 30 and adhesive layer 29 are advantageously prepared on a separate carrier layer and then connected with document material 1 after application of lacquer layers 27 and 28. The carrier material is then removed from lacquer layer 32.

Since magnetic layer 27 is usually printed by any printing process it is very easy to apply the magnetic coding in the areas of security element 25 where there are no gaps 31. Further additives can be integrated into second lacquer layer 28, such as coloring pigments, luminescent pigments, or effect or gloss pigments.

The inventive security elements can be advantageously used not only on or in bank notes but also on any other documents, such as checks, ID cards or the like.

Instead of a diffraction structure comprising a lacquer layer, metal layer and adhesive layer it is also possible to use other optically variable layers, such as interference layer structures, inks with interference layer pigments or liquid crystal pigments, etc.

With the use of translucent, optically variable layers such as certain interference layer pigments it may be useful to color lacquer layer 28 black since this can support the brilliance of the optically variable layer. The magnetic code represented by layer 27 is still machine-readable through these layers.

What is claimed is:

1. A security element (2, 25) for a security document (1) comprising a translucent plastic layer (7, 32) having an opaque layer (3) with gaps (4, 14, 16, 17, 31) in the form of indicia visually readable at least in transmitted light, and a magnetic layer (5,27), wherein the magnetic layer (5,27) includes periodically spaced magnetic areas which combine with intermediate non-magnetic areas therebetween to form a coding (20), said coding (5, 27) and said gaps (4, 14, 16, 17, 31) being dimensioned and disposed relative to each other so that said gaps (4, 14, 16, 17, 31) are positioned separately from said magnetic areas.

2. A security element (2) according to claim 1, wherein the magnetic layer (5, 27) is disposed under the opaque layer (3, 30).

3. A security element (2) according to claim 2, wherein the opaque layer (3) is a black printing ink, the opaque layer (3) and the coding (20) being covered by a semitransparent metal layer (10) at least on the side facing away from the plastic layer (7).

4. A security element (2) according to claim 1 wherein the gaps (4, 16) are disposed within the intermediate non-magnetic areas (15) of the coding (20).

5. A security element (2) according to claim 1, wherein the coding (20) is composed of word and separation segments, the separation segments including magnetic layer-free areas, and the gaps (4, 16) being disposed at least in said magnetic layer-free separation segments.

6. A security element (2) according to claim 1, wherein the coding (20) extends only over a partial area of the security element.

7. A security element (2) according to claim 6, wherein said gaps (17) are likewise disposed in the partial area not occupied by coding (20).

8. A security element (2) according to claim 1, wherein the security element (2) has the form of a strip and the magnetic layer areas (5) extend over the total width of the security element.

9. A security element (2) according to claim 1, wherein the magnetic areas (5) of the coding (20) are coated with magnetic material of predetermined thickness, and said magnetic areas (5) are interconnected via a second magnetic layer, said second magnetic layer having a smaller layer thickness than said magnetic layer so that it does not impair the machine readability of the coding.

10. A security element (2) according to claim 1, wherein a second magnetic layer (11, 12, 13) is provided and disposed so that the gaps (4) are recognizable in transmitted light.

11. A security element (2) according to claim 10, wherein the second magnetic layer (12) represents a second coding identical to the coding (20).

12. A security element (2) according to claim 11, wherein the codings (12, 20) are disposed parallel to each other and the gaps (4) readable in transmitted light are present between the codings (12, 20).

13. A security element according to claim 12, wherein the codings (12, 20) are disposed asymmetrically with respect to the gaps (4).

14. A security element according to claim 10, wherein the magnetic areas (5) of the coding (20) are coated with magnetic material of predetermined thickness, and said magnetic areas (5) are interconnected via the second magnetic layer (11), said second magnetic layer (11) having a smaller layer thickness than said magnetic layer so that it does not impair the machine readability of the coding (20).

15. A security element according to claim 10, wherein the second magnetic layer (13) represents a second coding which is a negative representation of the coding (20), the codings being disposed parallel to each other.

16. A security element according to claim 15, wherein the gaps (4) are disposed between the two codings (13, 20).

17. A security element (2) according to claim 10, wherein second information is provided in the form of gaps in the opaque layer which differ in size from the first gaps.

18. A security element (2) according to claim 1, wherein the security element (2) is subdivided at least into two partial areas (I, II, III), each partial area (I, II, III) including the coding (20) and the gaps (4) disposed parallel to each other, said partial areas (I, II, III) being disposed in different orientation relative to each other.

19. A security element (2) according to claim 1, wherein the opaque layer (3) and the coding (20) are disposed on different surfaces of the plastic layer (7), the gaps (4) being so disposed in the opaque layer (3) so as to be recognizable in transmitted light.

20. A security element (2) according to claim 19 wherein the magnetic areas (5) of the coding (20) are coated with magnetic iron.

21. A security element (2) according to claim 1, wherein the magnetic layer (5) is covered by another opaque layer (8).

22. A security element (2) according to claim 1, wherein the opaque layer (3) is a vaporized metal layer or a bronze printing ink.

23. A security element (2) according to claim 1, wherein the plastic layer (7) has a diffraction structure in the form of a relief on one of its surfaces.

24. A security element (2) according to claim 1, wherein the security element (2) has the form of a thread or strip.

25. A security element (2) according to claim 24, wherein the coding is disposed in the edge area along the thread or strip.

26. A security element (25) according to claim 1, wherein the plastic layer is a lacquer layer (32) with a relief structure forming a diffraction structure, said opaque layer combining with a reflection layer (30).

27. A security element (25) according to claim 26, including another all-over lacquer layer (28) disposed between the magnetic layer (27) and the optically variable layer (32).

28. A security element (25) according to claim 27, wherein said another lacquer layer (28) is colored, said lacquer layer further including authenticity marks.

29. A security document (1) including a security element (2) according to claim 1.

30. A security document (1) according to claim 29, wherein the security element (2) is embedded at least partly in the document material.

31. A security document (1) according to claim 29, wherein the security element (2) is disposed on the surface of the security document (1).

32. A method for producing a security element for a security document comprising a translucent plastic layer having an opaque layer with gaps in the form of indicia visually readable at least in transmitted light, and a magnetic layer, comprising providing the translucent plastic layer with a magnetic layer in the form of periodically spaced areas which combine with intermediate non-magnetic areas therebetween to form a coding, applying a soluble printing ink in the form of the later gaps in good register with the magnetic layer, vapor coating the total foil with an opaque metal layer, dissolving the soluble printing ink to produce the gaps, cutting the foil in the form of the security elements.

33. A method according to claim 32, wherein in a first step an opaque layer is applied under the magnetic layer.

* * * * *